United States Patent
Schmidt

(10) Patent No.: US 7,094,376 B2
(45) Date of Patent: Aug. 22, 2006

(54) MATERIAL VOLUME COMPENSATION ASSEMBLY FOR A MOLD TOOL

(75) Inventor: Horst Schmidt, Tilbury (CA)

(73) Assignee: Build A Mold Limited, Windsor (CA)

( * ) Notice: Subject to any disclaimer, the term of this patent is extended or adjusted under 35 U.S.C. 154(b) by 161 days.

(21) Appl. No.: 10/630,267

(22) Filed: Jul. 30, 2003

(65) Prior Publication Data

US 2004/0022892 A1 Feb. 5, 2004

Related U.S. Application Data

(60) Provisional application No. 60/399,855, filed on Jul. 31, 2002.

(51) Int. Cl.
*B29C 45/10* (2006.01)
*B29C 45/80* (2006.01)

(52) U.S. Cl. .................... 264/328.8; 264/40.5

(58) Field of Classification Search ........... 264/328.8, 264/328.11, 328.12, 40.5
See application file for complete search history.

(56) References Cited

U.S. PATENT DOCUMENTS

| | | | |
|---|---|---|---|
| 4,076,788 A | * | 2/1978 | Ditto .................. 264/255 |
| 4,497,359 A | * | 2/1985 | Suzuki et al. ............ 164/120 |
| 5,340,528 A | | 8/1994 | Machida et al. |
| 5,667,868 A | | 9/1997 | Freeman |

FOREIGN PATENT DOCUMENTS

| | | |
|---|---|---|
| EP | 0 662 383 | 7/1995 |
| JP | 51068666 | 6/1976 |
| JP | 58217331 | 12/1983 |
| JP | 60008026 | 1/1985 |
| JP | 63041118 | 2/1988 |
| JP | 63209915 | 8/1988 |
| JP | 63281817 | 11/1988 |
| JP | 63295223 | 12/1988 |
| JP | 03193428 | 8/1991 |
| JP | 06087143 | 3/2004 |

OTHER PUBLICATIONS

International Search Report dated Oct. 20, 2003.

* cited by examiner

*Primary Examiner*—Michael P. Colaianni
*Assistant Examiner*—Monica A Huson
(74) *Attorney, Agent, or Firm*—Carlson, Gaskey & Olds

(57) ABSTRACT

A carrier assembly controls movement of a movable member within a mold tool to first receive a quantity of molten material, and then displace that molten material back into a mold cavity during solidification of a molded article. The moveable member moves relative to the surface of the mold cavity to compensate for local volume changes in a molded part that occur during solidification to substantially eliminate depressions and sink marks on an outer surface of a plastic injection molded part.

3 Claims, 5 Drawing Sheets

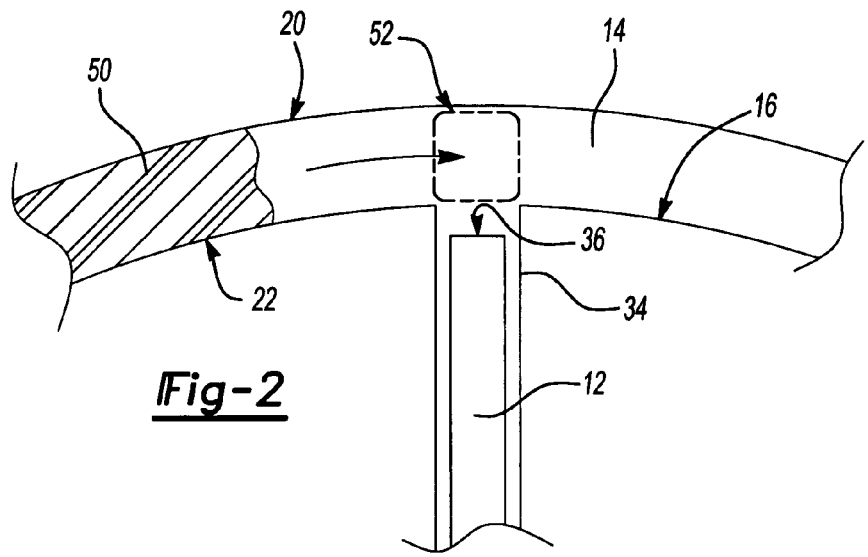
_Fig-2_
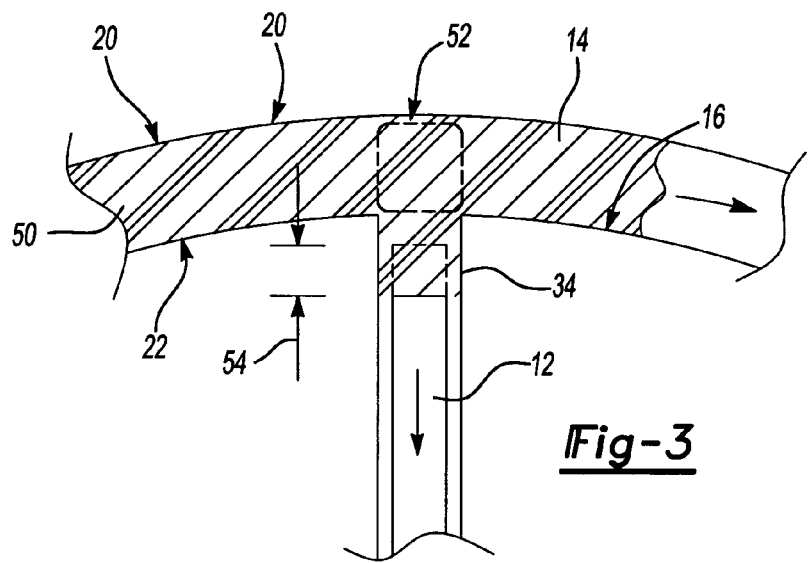
_Fig-3_
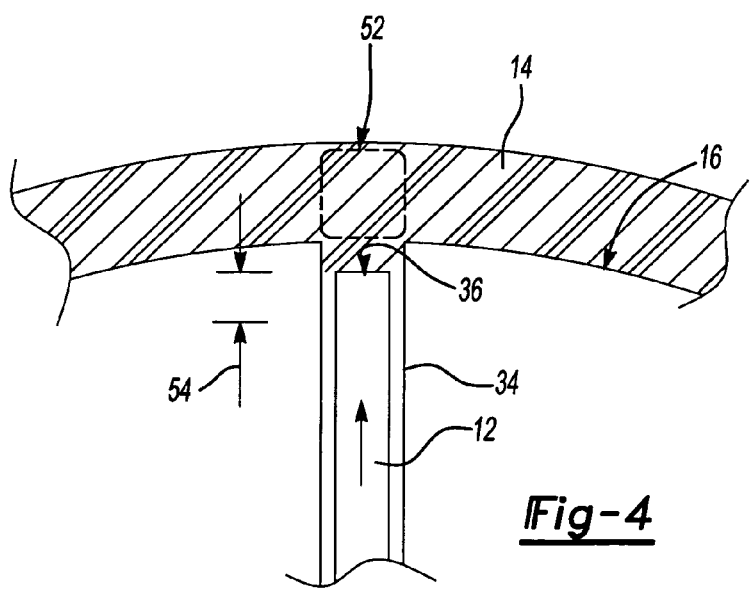
_Fig-4_

MATERIAL VOLUME COMPENSATION ASSEMBLY FOR A MOLD TOOL

REFERENCE TO RELATED APPLICATIONS

The present invention claims the benefit of U.S. Provisional Patent Application No. 60/399,855 filed Jul. 31, 2002.

BACKGROUND OF THE INVENTION

This invention is an assembly for a mold tool and specifically, a material compensation assembly for reducing sink mark formation on a molded article.

Typically, sink marks are the result of variations in plastic material cross-sections in a molded part. The thicker cross-section of molten material solidifies slower than surrounding thinner sections. Because plastic material decreases in volume during solidification, the thicker sections that solidify last pull in surrounding material to compensate for the decrease in volume. The pulling in of surrounding material will often result in sink marks forming on the outer surface. Slower solidification results in areas on the opposite surface that are inconsistent with the remainder of the outer surface. In other words, the outer surface includes depressions in the area of the increased material thickness.

The thicker section naturally shrinks more due to the additional material present in these localized areas. As appreciated, the last section to solidify is the very center of the thickest section. As this material shrinks, surrounding material is pulled in around and onto the thicker cross-section. Material that does not have the structural strength to resist this pull is deformed as it collapses in the direction of the pull, causing shrinkage. The end result is a surface sink mark or depression in areas of increased relative thickness.

Many molded parts have a "show" side that is desired to have a specific cosmetic appearance. Sink marks destroy the cosmetic appearance and degrade the aesthetic value of the plastic injection molded part. Currently, plastic injection molded parts are increasingly being used for exterior body panels in automotive applications. Further, injection molded parts are extensively used in consumer articles such as computers, monitors, telephones, radios, automotive parts and other consumer goods. In such applications, the appearance of the plastic injection molded part is of great importance. Sink marks complicate the fabrication of molds to produce such articles. These molds are complicated because they must be designed to eliminate or hide sink marks.

Accordingly, it is desirable to design an assembly to compensate that prevents depressions and sink marks caused by volume changes between adjacent areas of differing thickness.

SUMMARY OF THE INVENTION

An embodiment of this invention is a material volume compensation assembly for a mold tool including a member movable relative to a cavity surface to first receive a quantity of molten material and then locally displace molten material to compensate for volume changes during solidification.

The material volume compensation assembly of this invention includes a carrier assembly that controls movement of a movable member to first receive a quantity of molten material, and then displace that molten material during solidification of a molded article. The moveable member moves relative to the surface of the mold cavity to compensate for local volume changes in a molded part that occur during solidification to substantially eliminate depressions and sink marks on an outer surface of a plastic injection molded part.

Accordingly, this invention provides volume compensating assembly that prevents depressions and sink marks caused by volume changes between adjacent areas of differing thickness.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 2 is an enlarged view of a movable member according to this invention during mold fill;

FIG. 3 is an enlarged view of the movable member receiving molten material;

FIG. 4 is an enlarged view of the movable member displacing molten material;

DETAILED DESCRIPTION OF THE PREFERRED EMBODIMENT

Figure 1:
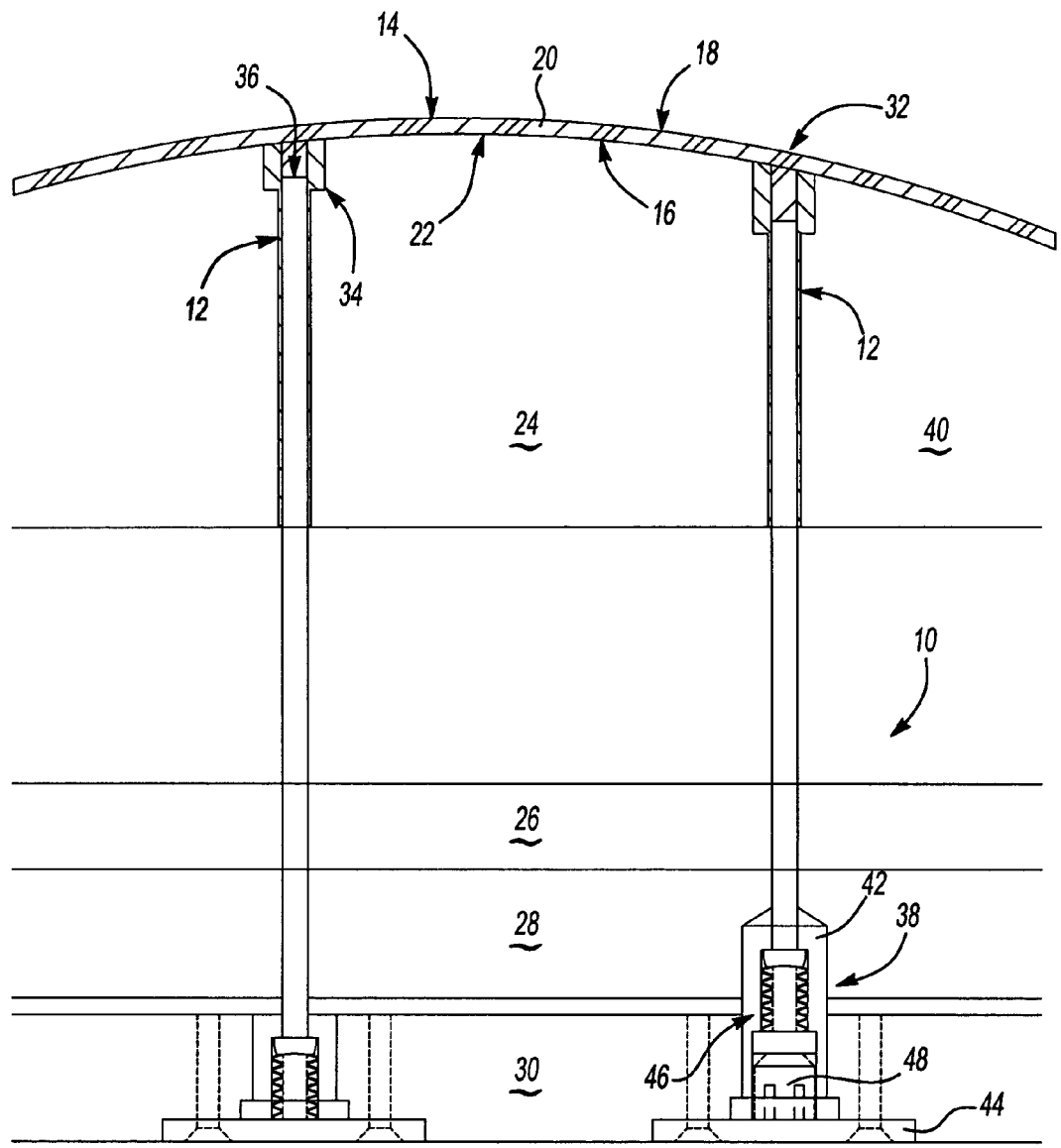
FIG. 1 is a cross-sectional view of the volume compensating device within a mold.

Referring to FIG. 1, a material volume compensating assembly 10 mounted within a mold tool 40 includes a pin 12 within a passage 34 that receives molten material during fill of a mold cavity 14. The molten material received within the passage 34 is then displaced back into the mold cavity 14 and into a molded article 18 during solidification to compensate for local changes in volume that can cause depressions or sink marks on a surface 20 of the completed molded article 18.

The pin 12 includes a face 36 that forms a portion of an inner surface 16 of the mold cavity 14. The pin 12 is supported for movement by a carrier assembly 38 mounted within the mold tool 40. The mold tool 40 includes a core clamp plate 30, an ejector plate 28, a retainer plate 26 and a mold core block 24. The pin 12 extends through the mold tool components through the passage 34 to form a portion of the mold cavity surface 16. It is within the contemplation of this invention to use this device with other mold configurations. A worker skilled in the art with the benefit of this disclosure would recognize the benefits of this invention for other types of molds, including plastic injection and die casting molds.

The molded article 18 includes the show side 20 and the inner side 22. In some molded articles a depression or sink mark forms in an area indicated by 32. This aesthetically degrades the show side 20 of the molded article 18. The pin 12 includes a distal end disposed within the carrier assembly 38. The carrier assembly 38 includes a housing 42 mounted atop a base plate 44. Within the housing 42 is a plurality of bevel springs 46. The springs 46 are held in place by a setscrew 48. As appreciated, although preferably bevel springs are used in this embodiment, it is within the contemplation of this invention to use other springs known to a worker skilled in the art.

The pin 12 eliminates sink marks in the molded part by receiving molten material during fill of the mold and pushing that received molten material back into the local area of the molded article 18 that is last to solidify. The pin 12 is biased by the bevel springs 46 at a rate equal to or higher than the rate of shrinkage of the molten material. The force exerted on the pin 12 into the molded article 18 is such that a desired local volume within the molded article is maintained during the solidification process. Preferably, the desired local volume is a maximum volume for that specific local area. In some applications, the desired local volume may differ due to specific part geometries and configurations. Displacing molten material into areas of the molded article 18 that are relatively thicker prevents excessive shrinkage from creating depressions or sink marks on the show side 20 of the molded article 18. In other words, the ejector pin 12 displaces enough molten material to accommodate changes in volume of molten material due to shrinkage.

Referring to FIG. 2, an enlarged view of the pin 12 and the local area of the mold cavity 14 is shown. Molted material 50 advances to fill the entire mold cavity 14 at a desired pressure. The pressure required to fill the mold cavity 14 is as known to a worker skilled in the art. The pin 12 is preferably disposed within a passages 34 adjacent the cavity surface 16. As appreciated, sink marks often form in areas of increased volume 52, such as where a boss or rib is provided in the molded article 18. The increased volume section 52 accumulates a greater amount of molten material 50, and therefore solidifies slower than the surrounding areas. The section 52 therefore draws material from the surrounding areas, potentially causing sink marks on the outer surface adjacent the section 52.

Referring to FIG. 3, as the molten material 50 fills the mold cavity 14, the pin 12 is pushed back a predetermined distance by the pressure of injected molten material 50. The distance that the pin 12 recedes within the passage 34 is indicated at 54. The distance 54 allows a desired volume of molten material into the passages 34. The amount of molten material received depends on the amount of force exerted on the pin 12 by the carrier assembly 38. The force exerted on the pin 12 limits the travel of the pin 12 and the amount of molten material received within the passage 34. The amount of molten material received within the passage 34 is determined to compensate for material shrinkage and maintain a constant volume within the section 52.

Referring to FIG. 4, the cavity 14 is filled and the molten material 50 begins to cool and solidify, the pin 12 displaces molten material 50 first receives within the passages back into the section 52. The additional material pushed back into the molded article 18 to maintain a substantially constant maximum volume within the thicker increased volume section 52. The feeding of molten material into the section 52 provides material to compensate for the increased shrinkage, reducing the amount of material drawn into the section 52 to reduce and substantially eliminate sink marks.

The forces exerted on the pin 12 are determined relative to the shrinkage characteristics of the material such that sufficient amounts of material are added during solidification of the molten material into the molded article. Pressure on the pin 12 must be great enough to displace the solidifying molten material into the molding cavity during the cooling process. However, the bias on the pin 12 must be less than the injection and backpressures of the mold tool so that the pin 12 is pushed back during the fill cycle of the tool.

Figure 5:
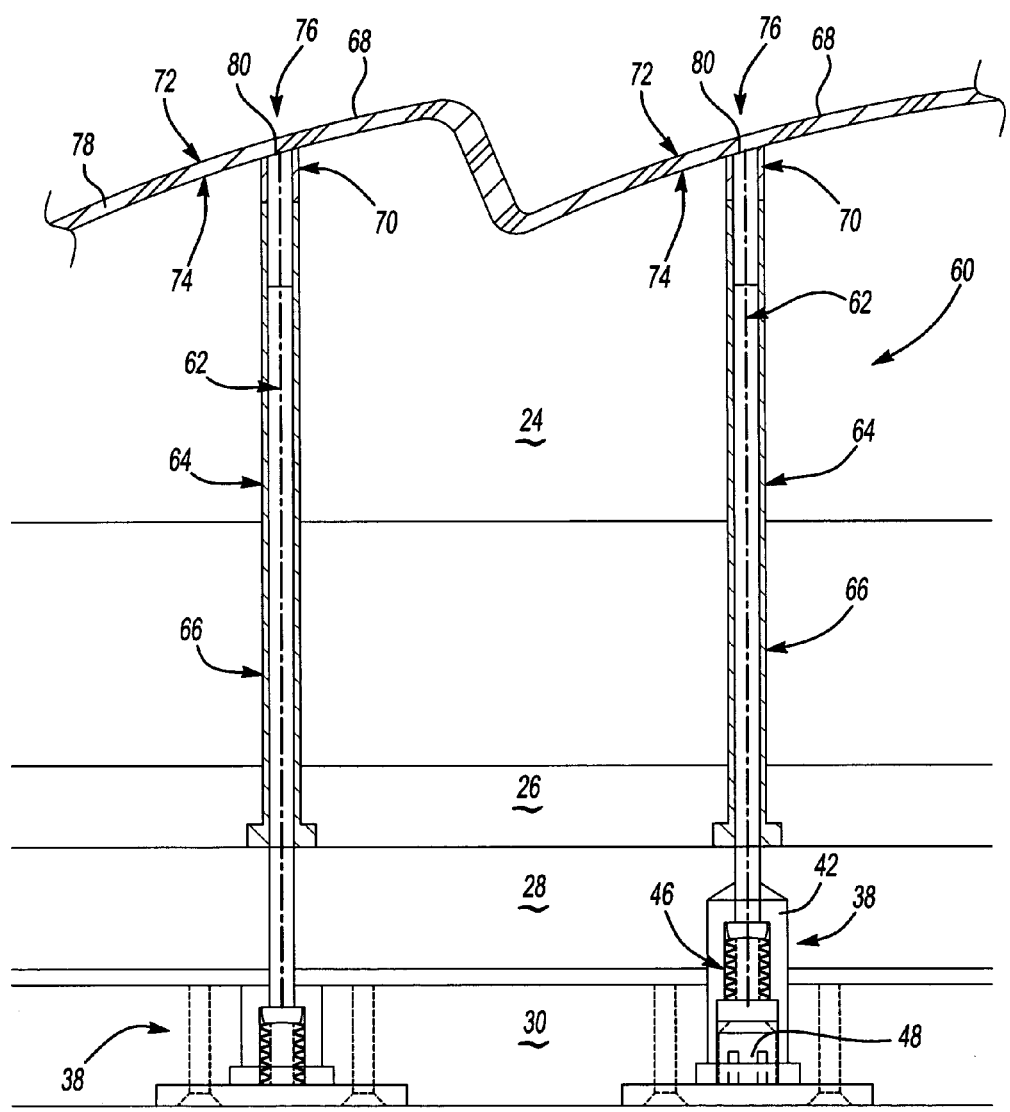
FIG. 5 is cross-sectional view of another volume compensating device according to this invention.

Referring to FIG. 5, another volume displacement device 60, a core pin 62 extends through a core pin sleeve 64 and injector sleeve 66. The core pin 62 forms an internal feature of a molded article 68. As appreciated, core pins form internal features of the molded part such as holes, ribs or other features as is known to a worker skilled in the art. Additional material for required for the internal feature 70 of the molded article 68 can cause imperfections on a surface 72.

The carrier assembly 38 applies a force to the core pin 62 such that a desired amount of molten material is received within the core sleeve 64 during initial filling of the mold cavity 78. Once the mold cavity 78 is filled and the molten material begins to solidify, the core pin 62 displaces the received molten material upward into the molded article 68 to provide additional material to an area 80 having a larger volume to substantially prevent sink marks on the outside surface 72.

Figure 6:
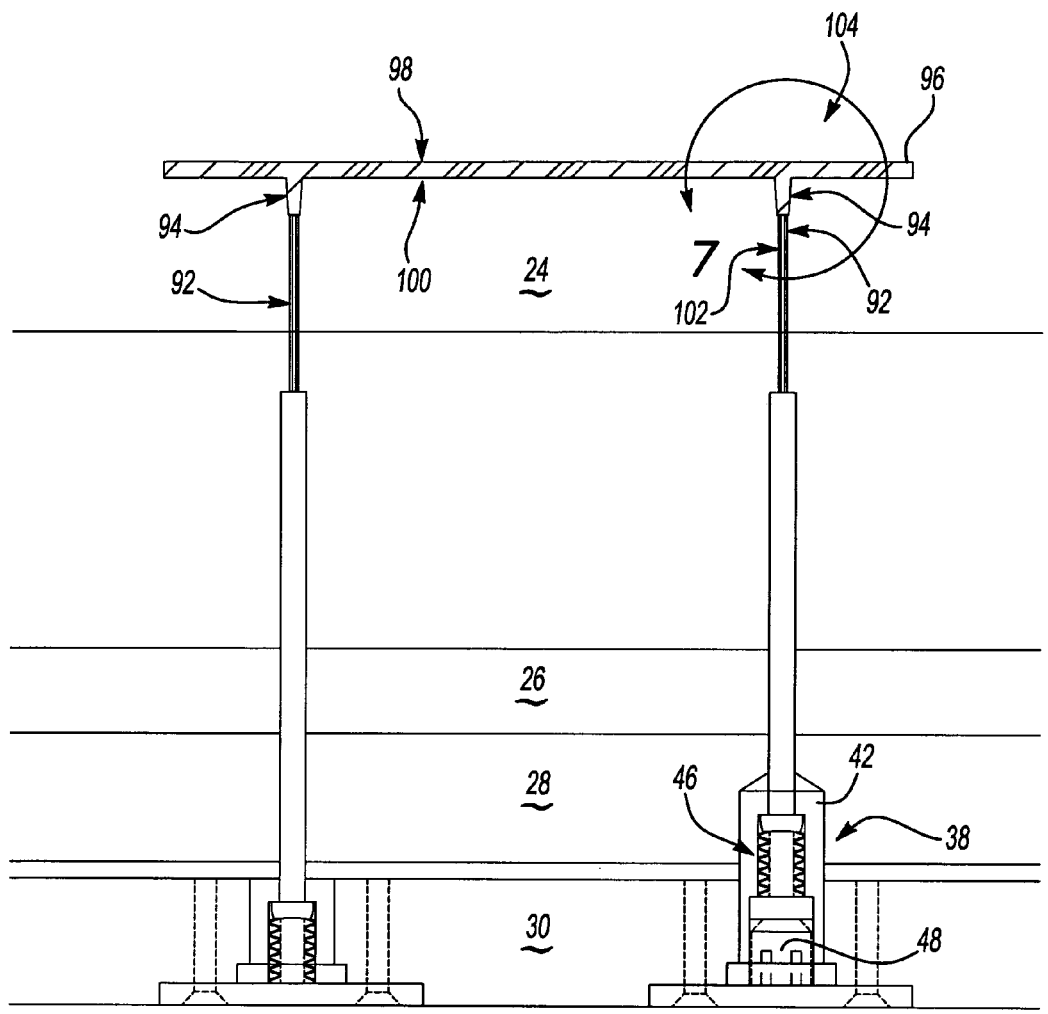
FIG. 6 is cross-sectional view of another volume compensating device according to this invention.

Referring to FIG. 6, another volume displacement device 90 includes a blade pin 92 pushes on a rib 94 formed within a molded article 96. The rib 94 includes a greater amount of material, potentially causing a depression or sink mark on an outer surface 98 of the molded article 96. The carrier assembly 38 provides an upward bias force on the rib 94 to displace molten material received during initial fill of the mold cavity 100.

Figure 7:
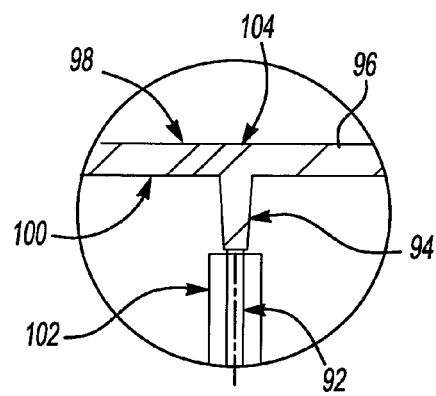
FIG. 7 is an enlarged view of the contact area of the blade pin.

Referring FIG. 7, the blade pin 92 contacts the rib 94 and by way of the springs 46 within the carrier assembly 38 forces molten material received within passage 102 back into the molded article 96. Displacement of the additional molten materials prevents molten material from being drawn into the thicker section 104, causing shrinkage on the outer surface 98.

As appreciated the specific shape of the pin or movable member that receives molten material and then pushes the material back into the areas of increased volume is application dependent. The movable member can be a round pin, a blade shape having a rectangular surface, or any irregular shape configured to first accept than displace molten material for a specific molded article configuration. The specific shape and size of the movable member is application specific and a worker skilled in the art with the benefit of this disclosure would understand applicable shapes and sizes corresponding to a specific molded article.

Further, the moveable member refers to any mold device movable within the mold to form features within the part or eject the part from the mold. Such movable members may include parts for ejecting the molded article from the mold or for forming cavities within the molded article. Further, the pin may also be for forming ribs within the plastic part to increase strength of the plastic injected molded part.

Figure 8:
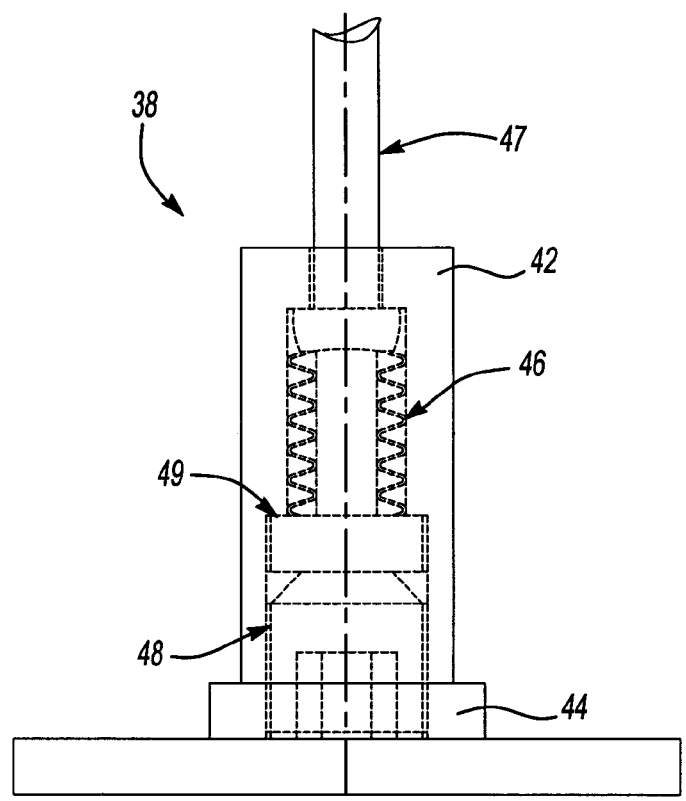
FIG. 8 is a cross-sectional view of a carrier assembly.

Referring to FIG. 8, the carrier assembly 38 includes a plurality of bevel springs 46. The bevel springs are 46 are stacked upon each other to form the biasing force on a shaft 47. The shaft 47 extends upward and forms a portion of the pin 12, core pin 62 or blade pin 92. The springs 46 are biased between the shaft 47 and a spring stop 49. The spring stop 49 is held within the housing 42 by the setscrew 48. The set screw 48 can be adjusted to fine tune the biasing force exerted by the springs 46. The base 44 is mounted to the core clamp plate 30 shown in FIG. 1.

The biasing force exerted by the spring 46 on the shaft 47 balances against molding injection pressures according to a predetermined relationship. The relationship between the biasing force and the molding injection pressures controls the distance that the face 36 of the pin 12 moves relative to the cavity surface. The amount of biasing force provided by the plurality of springs 46 is determined for the specific application mold injection pressures.

The biasing force required for the plurality of springs 46 is determined by first determined the amount of volume loss due to material shrinkage. The amount of volume loss due to material shrinkage is determined by applying a known shrinkage percentage to a known volume. The volume of material within a desired region is determined without regard to material shrinkage according to the relationship:

$$V = \pi * (D/2)^2 * h$$

Where: V=volume of the area;
D=diameter of pin; and
h=height or linear dimension of material.

The height of the molten material within the area of the pin 12 relates to the thickness of the material. This would be consistent throughout if not for the increased shrinkage of material in this region. Accordingly, a shrinkage factor is applied to determine the height loss, or depth of a potential sink mark for the localized area. This is determined by applying a known shrinkage factor as is commonly available from material providers and manufacturers. The shrinkage factor is applied to determine the new height, or loss of height that must be compensated for by the additional molten material. The new height is determined according to the relationship:

$$h_{new} = \frac{V \text{ shrink}}{\pi * (D/2)^2}$$

Where: h new=new height after shrinkage;
D=diameter of the pin; and
Volume after material shrinkage.

The new height is used to determine the loss of height. The loss of height is doubled to obtain the amount of movement required for the pin 12 to receive sufficient amount of molten material to push back up into the mold cavity to compensate for the material shrinkage. The amount of pin movement is then utilized to balance the springs 46 against the injection pressures of the mold. The forces on the pin 12 from injection pressures are determined by the relationship of injection pressures over the area of the face 36 of the pin 12. The springs 46 are then arranged to provide the biasing force that will allow movement of the pin 12 into the passage 34 adjacent the cavity 14 to receive the amount of molten material required for preventing deformation caused by material shrinkage.

As appreciated, the bevel springs 46 are only one method of moving the shaft 47 relative to the cavity surface 16. Other springs known in the art are also within the contemplation of this invention.

Figure 9:
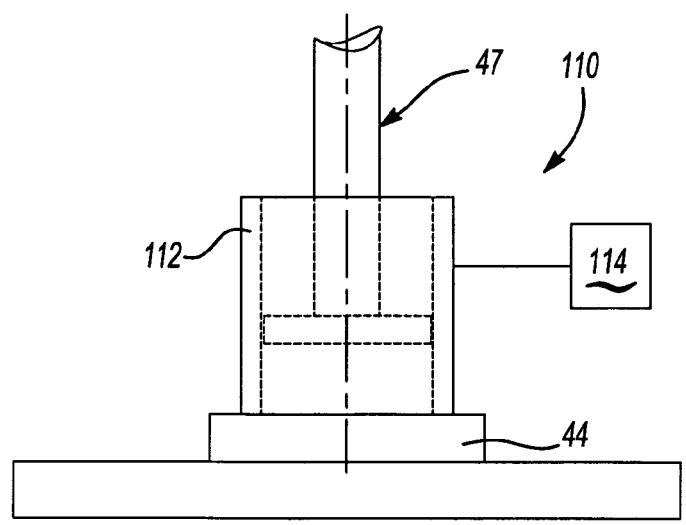
FIG. 9 is a cross section view of another carrier assembly according to this invention.

Referring to FIG. 9, another carrier assembly 110 is schematically shown and includes an actuator 112 controlled by a controller 114. The controller 114 coordinates movement of the shaft 47 to first receive, and then displace molten material. As appreciated, it is within the contemplation of this invention that the actuator 112 may be a mechanical device, an electric motor, or a hydraulic or pneumatically operated cylinder as are known.

The specific forces required of the carrier assembly 38 are determined in accordance with molded injection pressures, fill and pack pressures required for the mold and location within the mold. As appreciated fill, pack and hold pressures vary with the type of plastic molded being molded and the pin location relative to the gate location within the mold cavity.

Another consideration is the overall movement required to affect the local volume change to prevent shrink within the area of increased volume. As appreciated, pin movement is equal to or greater than the shrink volume divided by the end area of the movable member. The specific amount of movement and force required to affect that movement relative to the plastic injection molding pressure is application specific and dependent on the specific mold parameters including the mold pressures, holding pressures, type of plastic injected into the mold and thickness of the molded article in the area required to eliminate the occurrence of sink holes or depression areas.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A method molding a molded article comprising:
   a) introducing molten material into a mold cavity;
   b) receiving a predetermined amount of molten material into a passage adjacent said mold cavity;
   c) displacing said predetermined amount of material from said passage and into said mold cavity during solidification of said molten material;
   d) providing for travel of a movable member within said passage substantially equal to twice a determined amount of height loss caused by material shrinkage; and
   e) determining an amount of said molten material received within said passage according to a relationship between material shrinkage and mold injection pressures comprising determining a biasing force for biasing movement of said movable member against injection pressures such that movement of said movable member within said passage is substantially equal to twice the amount of height loss caused by material shrinkage.

2. The method as recited in claim 1, wherein said biasing force is determined as a percentage of molding injection pressures.

3. A method of compensating for material shrinkage during a plastic molding, said method comprising the steps of:
   a) introducing molten plastic material into a mold cavity;
   b) determining a volume of material required to compensate for material shrinkage in a localized region according to a relationship between material shrinkage properties of the plastic material and injection pressures utilized to introduce molten plastic into the mold cavity;
   c) determining a biasing force for biasing a movable member against the injection pressure such that displacement of the movable member provides for receipt of a volume of plastic material greater than or equal to two times the volume determined to compensate for material shrinkage;
   d) displacing a movable member into a passage adjacent the mold cavity to received the determined volume of plastic material; and
   e) expelling a portion or the determined volume back into the mold cavity during solidification of the plastic material.

* * * * *

UNITED STATES PATENT AND TRADEMARK OFFICE
CERTIFICATE OF CORRECTION

PATENT NO. : 7,094,376 B2
APPLICATION NO. : 10/630267
DATED : August 22, 2006
INVENTOR(S) : Horst Schmidt It is certified that error appears in the above-identified patent and that said Letters Patent is hereby corrected as shown below:

Claim 1, Column 6, line 62: "or" should be --of--

Signed and Sealed this

Twenty-eighth Day of November, 2006

JON W. DUDAS
*Director of the United States Patent and Trademark Office*